(12) United States Patent
Tsai

(10) Patent No.: US 9,460,684 B2
(45) Date of Patent: Oct. 4, 2016

(54) SYSTEM AND METHOD FOR ILLUMINATING CONNECTOR PORTS

(75) Inventor: Leonard Tsai, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1766 days.

(21) Appl. No.: 13/377,535

(22) PCT Filed: Jan. 31, 2008

(86) PCT No.: PCT/US2008/001289
§ 371 (c)(1),
(2), (4) Date: Dec. 9, 2011

(87) PCT Pub. No.: WO2009/096917
PCT Pub. Date: Aug. 6, 2009

(65) Prior Publication Data
US 2012/0100747 A1   Apr. 26, 2012

(51) Int. Cl.
| | | |
|---|---|---|
| *B60Q 1/124* | (2006.01) | |
| *G09G 5/00* | (2006.01) | |
| *G06F 3/14* | (2006.01) | |
| *H04N 21/436* | (2011.01) | |
| *G09G 3/34* | (2006.01) | |
| *H04N 21/485* | (2011.01) | |

(52) U.S. Cl.
CPC ............... *G09G 5/003* (2013.01); *G06F 3/14* (2013.01); *H04N 21/436* (2013.01); *G09G 3/3406* (2013.01); *G09G 5/006* (2013.01); *G09G 2320/08* (2013.01); *H04N 21/485* (2013.01)

(58) Field of Classification Search
CPC ........ H01R 3/00; H01R 13/06; H01R 13/64; H01R 13/641; H01R 13/7175; G09G 3/14; G09G 5/003; G09G 5/005; G09G 5/006; H04N 21/436; H04N 21/4385
USPC .............................. 362/23.01, 253, 457–458
See application file for complete search history.

(56) References Cited

U.S. PATENT DOCUMENTS

| | | | |
|---|---|---|---|
| 4,978,317 | A | 12/1990 | Pocrass |
| 5,466,174 | A | 11/1995 | Savage, Jr. |
| 5,601,451 | A | 2/1997 | Driones et al. |
| 5,613,873 | A | 3/1997 | Bell, Jr. |
| 5,700,157 | A | 12/1997 | Chung |
| 5,790,041 | A | 8/1998 | Lee |
| 5,876,239 | A | 3/1999 | Morin et al. |
| 5,885,100 | A | 3/1999 | Talend et al. |
| 6,159,037 | A | 12/2000 | Madsen et al. |
| 6,257,906 | B1 * | 7/2001 | Price et al. .................. 439/131 |

(Continued)

FOREIGN PATENT DOCUMENTS

| | | |
|---|---|---|
| JP | 1995107565 | 4/1995 |
| KR | 1020000074940 | 12/2000 |
| KR | 1020070006464 | 1/2007 |

OTHER PUBLICATIONS

ISA/KR, International Search Report dated Sep. 29, 2008, PCT/US2008/001289 filed Jan. 31, 2008.

*Primary Examiner* — Jason Moon Han
(74) *Attorney, Agent, or Firm* — HP Inc Patent Department (57) ABSTRACT

A method for illuminating a connector port of an electronic device. The method comprising presenting information associated with the connector port on a user interface; and illuminating the connector port on the electronic device in response to a user selecting the connector port via the user interface.

17 Claims, 5 Drawing Sheets

(56) References Cited

U.S. PATENT DOCUMENTS

| | | |
|---|---|---|
| 6,357,887 B1 | 3/2002 | Novak |
| 6,361,357 B1 | 3/2002 | Stillwell et al. |
| 6,483,712 B1 | 11/2002 | Oliphant et al. |
| 7,194,183 B2 | 3/2007 | Thornton et al. |
| 7,812,737 B1 * | 10/2010 | Hunter .......................... 340/687 |
| 8,427,296 B2 * | 4/2013 | Pance et al. .................. 340/505 |
| 8,588,050 B2 * | 11/2013 | Caveney et al. ............... 370/200 |
| 2002/0099516 A1 * | 7/2002 | Guzman ........................ 702/160 |
| 2005/0245127 A1 * | 11/2005 | Nordin et al. .............. 439/540.1 |
| 2006/0044148 A1 * | 3/2006 | Daniels et al. ............. 340/686.1 |
| 2006/0155914 A1 * | 7/2006 | Jobs et al. ..................... 711/100 |
| 2006/0164561 A1 * | 7/2006 | Lacy .................. H04N 5/44513 348/706 |
| 2007/0130398 A1 | 6/2007 | Halpin |

\* cited by examiner

SYSTEM AND METHOD FOR ILLUMINATING CONNECTOR PORTS

CROSS-REFERENCE TO RELATED APPLICATION

This application is a national stage application under 35 U.S.C. §371 of PCT/US2008/001289, filed Jan. 31, 2008.

BACKGROUND

Most electronic devices, including portable computers, desktop computers, personal digital assistants (PDAs), and television displays, have various ports or slots at their periphery to allow external devices to electrically couple to the electronic device. The external devices that electrically couple to these ports typically do so with plugs or cards that mate with the ports or slots. However, locating and/or distinguishing between the various available ports is not always an easy task.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

Figure 1:
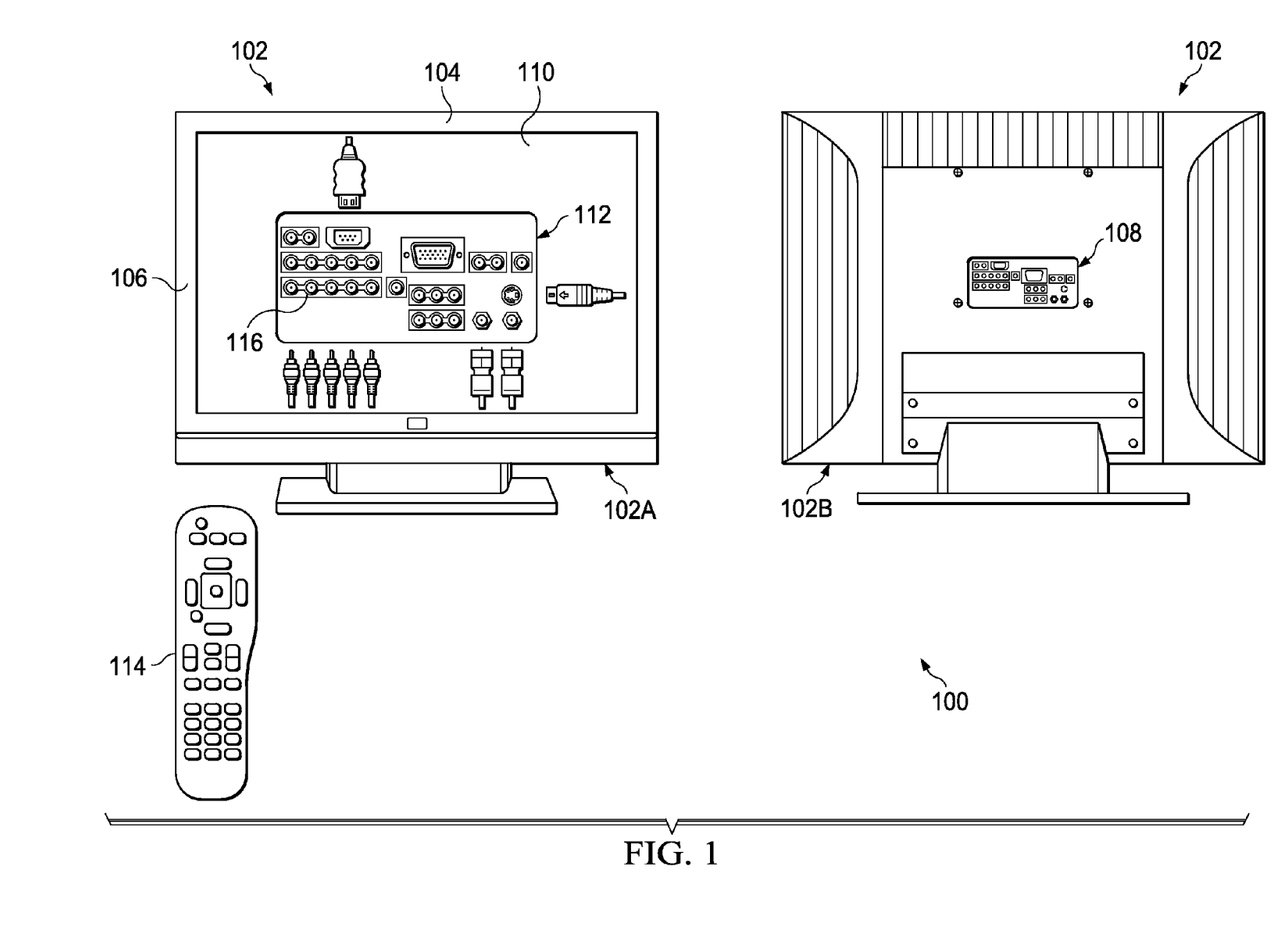
FIG. 1 is a diagram illustrating an embodiment of a port illumination system.

FIG. 1 is a diagram illustrating an embodiment of a port illumination system 100. Port illumination system 100 may be configured on an electronic device, such as electronic device 102. In FIG. 1, electronic device 102 is depicted as a liquid crystal display (LCD) television 104. However, electronic device 102 may be any type of electronic device including, but not limited to, a desktop computer, a portable computer, a plasma television, a rear projection television such as a digital light processing (DLP) and cathode ray tube (CRT) television and any other type of electronic device now known or later developed. FIG. 1 presents a view of a front portion 102A and a back portion 102B of electronic device 102.

Electronic device 102 comprises a display 106 for displaying images and connector ports 108 for connecting/disconnecting external devices to electronic device 102. Connector ports 108 may comprise of one or more connector ports. In FIG. 1, connector ports 108 is depicted on the back portion 102b of electronic device 102. However, it should be understood that connector ports 108 may be located on the side, top, and/or bottom of electronic device 102.

In the embodiment illustrated in FIG. 1, connector ports 108 is configured to be illuminable. A user interface 110 is presented on display 106 to assist a user in connecting external devices to connector ports 108. In some embodiments, user interface 110 may depict a graphical representation or replica 112 of connector ports 108 physically located on electronic device 102. However, user interface 110 may also present information associated with connector ports 108 in a textual and/or some other type of graphical format. For example, user interface 110 may simple list connector port 108 in a textual format and/or display information associated with connector port 108 in a table or grid format. In addition, in some embodiments, user interface 110 may indicate an availability status associated with connector ports 108. Further, in some embodiments, user interface 110 may provide information about compatible connector types, as illustrated in FIG. 1, and/or compatible electronic device types associated with connector ports 108.

A remote device 114 may be used to select a set of connector ports 116, within connector ports 108, via user interface 110. In response to receiving a user selection, port illumination system 100 illuminates at least one connector port 108 within the set of connector ports 116 on electronic device 102. In some embodiments, port illumination system 100 illuminates all connector ports 108 associated with the selected set of connector ports 116. The illuminated connector ports 108 assist a user in connecting and/or disconnecting the coupling connectors of external devices to/from electronic device 102. User interface 110 may provide a textual and/or graphical indication that the selected set of connector ports 116 has been illuminated.

In some embodiments, port illumination system 100 may also be configured to deactivate illumination of a connector port 108 on electronic device 102 after a connection has been established between a connector associated with an external device and a particular connector port 108. In addition, port illumination system 100 may indicate on user interface 110 that a particular connector port 108 has been successfully connected to a connector associated with an external device.

In some embodiments, port illumination system 100 illuminates only one connector port 108 associated with the selected set of connector ports 116. Port illumination system 100 may be configured to indicate on user interface 110 the corresponding illuminated connector port 108. Upon successfully connecting to the illuminated connector port 108, port illumination system 100 deactivates illumination of the connected port 108 and illuminates another unconnected connector port 108 of the selected set of connector ports 116. Port illumination system 100 repeats the method until all connector ports 108 within the selected set of connector ports 116 have been successfully connected.

In some embodiments, port illumination system 100 may be configured to assist a user in disconnecting external devices from electronic device 102. For example, port illumination system 100 may indicate on user interface 110 a connected status associated with the selected set of connector ports 116. A user may select on user interface 110 the set of connector ports 116 desiring to disconnect. In this situation, port illumination system 100 may illuminate the connector ports 108 corresponding to the selected set of connector ports 116 and deactivate illumination of individual connector ports 108 within the set of connector ports 116 in response to detecting a disconnection from the corresponding connector port 108. In some embodiments, port illumination system 100 may indicate on user interface 110 that the connector port 108 has been disconnected.

Figure 2:
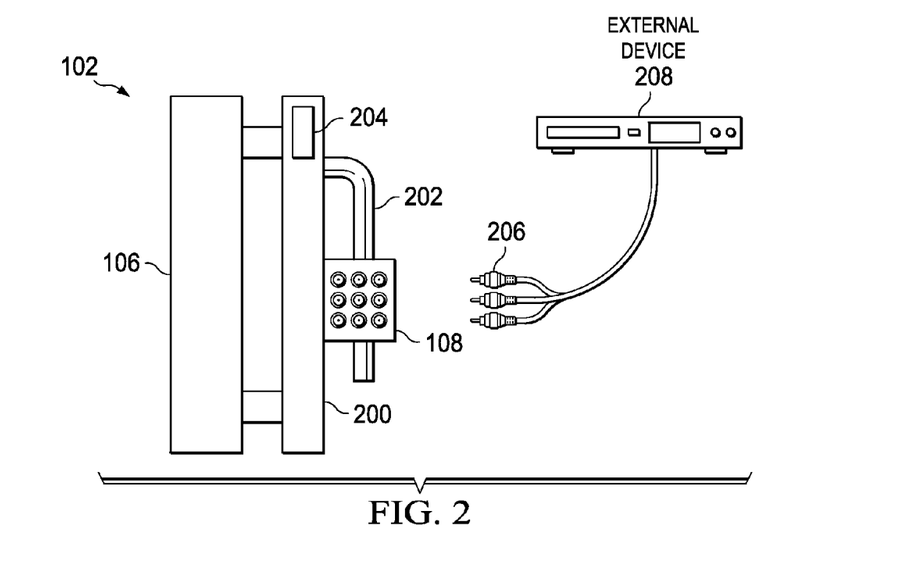
FIG. 2 is a diagram illustrating an electronic device configured with the port illumination system of FIG. 1.

FIG. 2 is a diagram illustrating electronic device 102 configured with port illumination system 100. In the embodiment illustrated in FIG. 2, electronic device 102 comprises of a main circuit board 200 coupled to display 106. A light pipe 202 extending from a backlight unit of main circuit board 200 is coupled to connector ports 108 to enable illumination of connector ports 108. Main circuit board 200 comprises of an array of circuitry and processors, including processors 204. Processors 204 may comprise of a set of one or more processors. Processors 204 execute instructions to generate user interlace 110. In addition, processors 204 execute instructions to control illumination of connector ports 108. In some embodiments, connector ports 108 may be configured to illuminate individually with a color corresponding to a compatible connector (e.g., yellow for a yellow composite video connection, red and white for red and white stereo audio connections, etc.).

An external device 208 connects to electronic device 102 via connector ports 108 using connector 206. External device 208 may be any type of device including, but not limited to, a Video Cassette Recording (VCR), a Digital Video Disc (DVD) player/recorder, a video/digital camera, a gaming system, and any other type of device now known or later developed. Connector 206 may include one or more connectors and may be any type of coupling connector such as, but not limited to, Secure Digital (SD) cards, Universal Serial Bus (USB) connectors, audio/video cables including High-Definition Multimedia Interface (HDMI) connectors, and any other type of connectors compatible with connector ports 108 now known or later developed.

Figure 3:
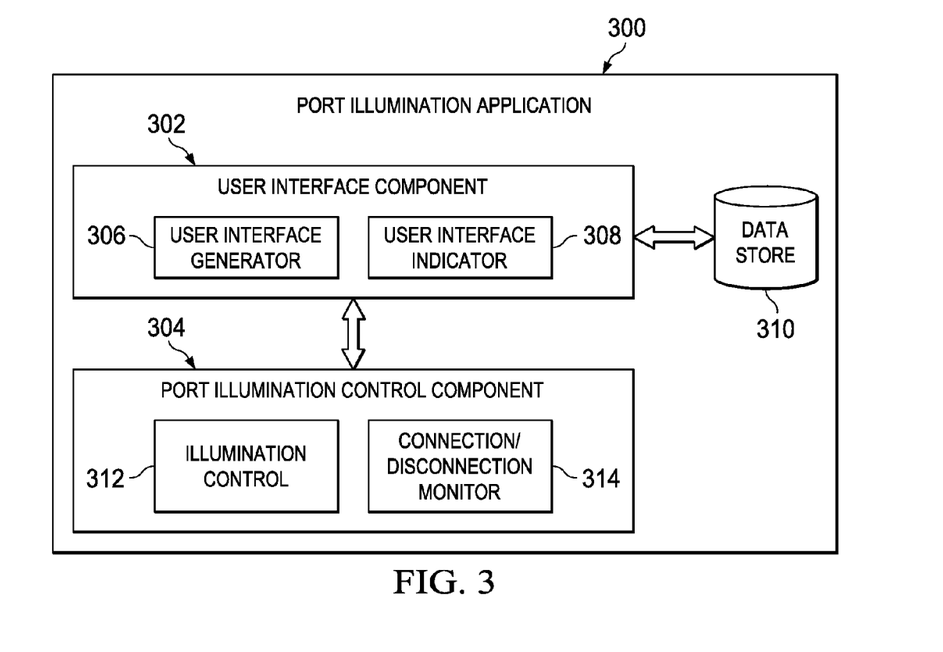
FIG. 3 is a block diagram illustrating an embodiment of a port illumination system.

FIG. 3 is a block diagram illustrating an embodiment of port illumination system 100. Port illumination system 100 comprises a port illumination application 300 that may be configured on an electronic device, such as electronic device 102. In some embodiments, port illumination application 300 may be stored in memory on main circuit board 200. Processors 204 may be used to execute instructions associated with port illumination application 300. In the embodiment illustrated in FIG. 3, port illumination application 300 comprises a user interface component 302, a data store 310, and a port illumination control component 304.

User interface component 302 handles generating and managing user interface 110. User interface component 302 comprises of a user interface generator 306 component and a user interface indicator 308 component. User interface generator 306 may be responsible for generating user interface 110. User interface generator 306 may retrieve and store information associated with connector ports 108 and user interface 110 in data store 310. For example, data store 310 may store information associated with compatible electronic device types and/or compatible connector types associated with connector ports 108. User interface generator 306 may retrieve this data from data store 310 in rendering user interface 110.

User interface indicator 308 is responsible for indicating on user interface 110 the corresponding illuminated connector ports 108 on electronic device 102. Further, in some embodiments, user interlace indicator 308 may indicate on user interface 110 deactivation of the illuminated connector port 108 in response to receiving an indication from port illumination control component 304 that a connector has connected with the particular connector port 108.

Port illumination control component 304 manages illumination of connector ports 108 on electronic device 102. In this embodiment, port illumination control component 304 comprises of an illumination control 312 component and a connection/disconnection monitor 314 component.

Illumination control 312 coordinates illumination of connector ports 108 on electronic device 102. For example, illumination control 312 may receive an indication from user interlace component 302 indicating a user selection of a set of connector ports 108 for connection/disconnection. In response, illumination control 312 illuminates the particular set of connector ports 108 on electronic device 102 and returns an indication to user interface component 302 that the particular set of connector ports 108 has been illuminated. Interface component 302 may then indicate on user interlace 110 that the particular set of connector ports 108 is illuminated.

Connection/disconnection monitor 314 is responsible for monitoring for when a connection or disconnection associated with an illuminated connector port 108 occurs. When a connection/disconnection occurs, connection/disconnection monitor 314 component reports the event to illumination control 312 to deactivate illumination of the particular connector port 108. In turn, illumination control 312 reports this event to interface component 302 for a corresponding indication on user interface 110.

Figure 4:
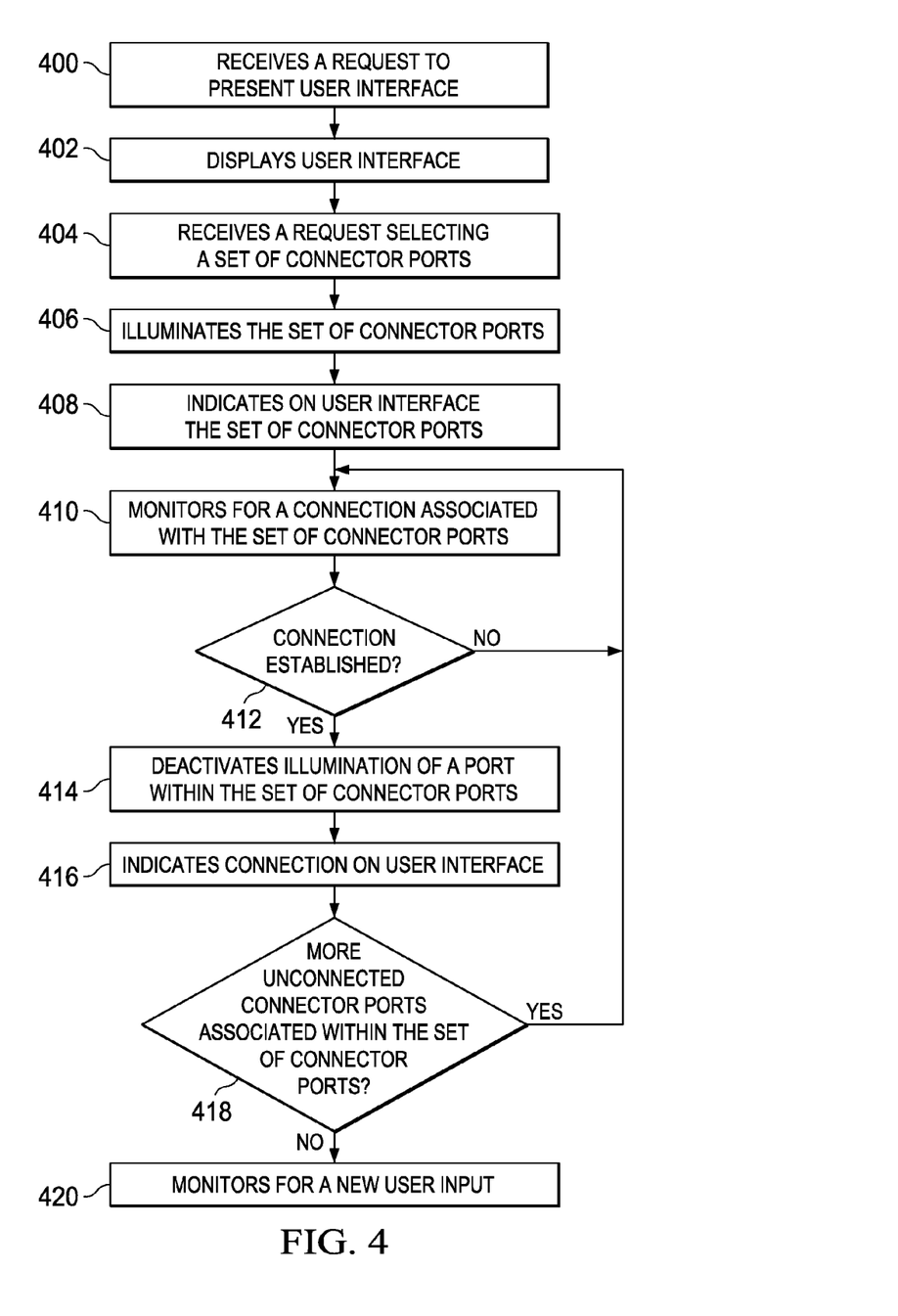
FIG. 4 is a flow diagram illustrating an embodiment of a method for connecting to a set of illuminable connector ports.

FIG. 4 is a flow diagram illustrating an embodiment of a method for connecting to a set of illuminable connector ports 108. The method of FIG. 4 may be implemented in a processor of electronic device 102, such as processors 204 shown in FIG. 2.

The method begins by receiving a request to present user interface 110 at block 400. The method displays user interface 110 at block 402. The method receives a request, via user interface 110, selecting a set of connector ports 108, such as connector ports 116 shown in FIG. 1, at block 404. At block 406, the method illuminates connector ports 108 corresponding to the selected set of connector ports 116 on electronic device 102. In addition, the method indicates on user interface 110 that particular connector ports 108 are illuminated at block 408. The method monitors for a connection associated with particular connector ports 108 corresponding to the selected set of connector ports 116 at block 410. In response to a determination that a connection has been established at block 412, the method deactivates illumination of a port 108 within the selected connector ports 116 at block 414. The method indicates on user interface 110 that the respective port 108 has been successfully connected at block 416. At block 418, the method determines if more unconnected connector ports 108 associated with selected set of connector ports 116 exist. If more unconnected connector ports 108 exist, the method returns to block 410 and monitors for a connection associated with connector ports 108. Once all the connector ports 108 associated with the selected set of connector ports 116 have been successfully connected, the method monitors for a new user input at block 420 The user input may include, but is not limited to, the user selecting another set of connector ports 108 or exiting user interface 110.

Figure 5:
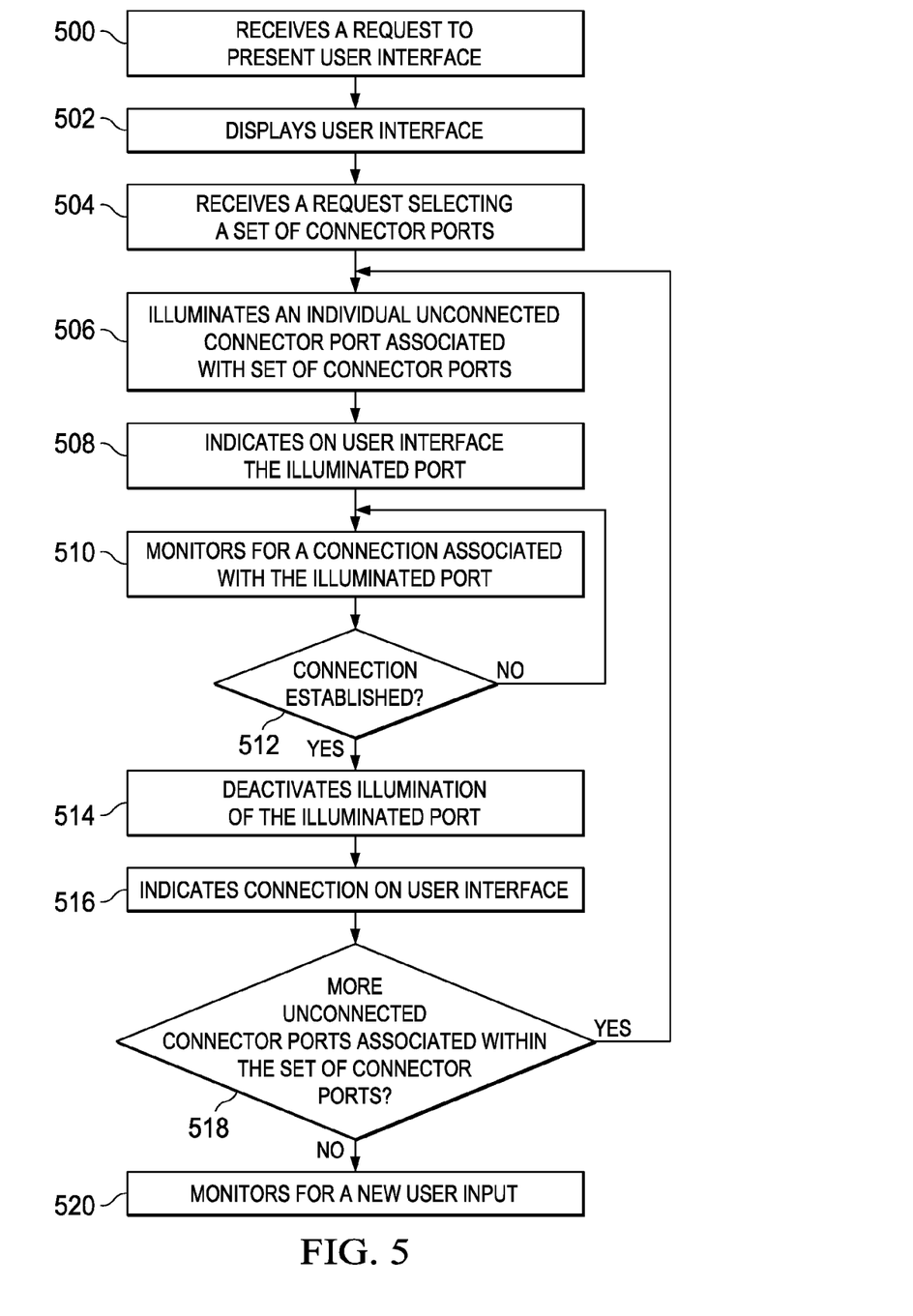
FIG. 5 is a flow diagram illustrating another embodiment of a method for connecting to a set of illuminable connector ports.

FIG. 5 is a flow diagram illustrating another embodiment of a method for connecting to a set of illuminable connector ports 108. The method of FIG. 5 may be implemented in a processor of electronic device 102, such as processors 204 shown in FIG. 2.

The method begins by receiving a request to present user interface 110 at block 500. The method displays user interface 110 at block 502. The method receives a request selecting a set of connector ports 108, such as connector ports 116 shown in FIG. 1, at block 504. At block 506, the method illuminates an individual connector port 108 associated with the selected connector ports 116 on electronic device 102. The method indicates connector port 108 as illuminated on user interface 110 at block 508. The method than monitors for a connection associated with connector port 108 at block 510. In response to detecting an established connection associated with connector port 108 at block 512, the method deactivates illumination of connector port 108 at block 514. In addition, the method indicates on user interface 110 that connector port 108 has been successfully connected at block 516. At block 518, the method determines if more unconnected connector ports 108 associated with the selected set of connector ports 116 exist. If more unconnected connector ports 108 exist, the method returns to block 506 and illuminates another unconnected connector port 108 associated with connector ports 116. Once all the ports 108 of the selected set of connector ports 116 have been successfully connected, the method monitors for a new user input at block 520. The user input may include, but is not limited to, the user selecting another set of connector ports 108 or exiting user interface 110.

Figure 6:
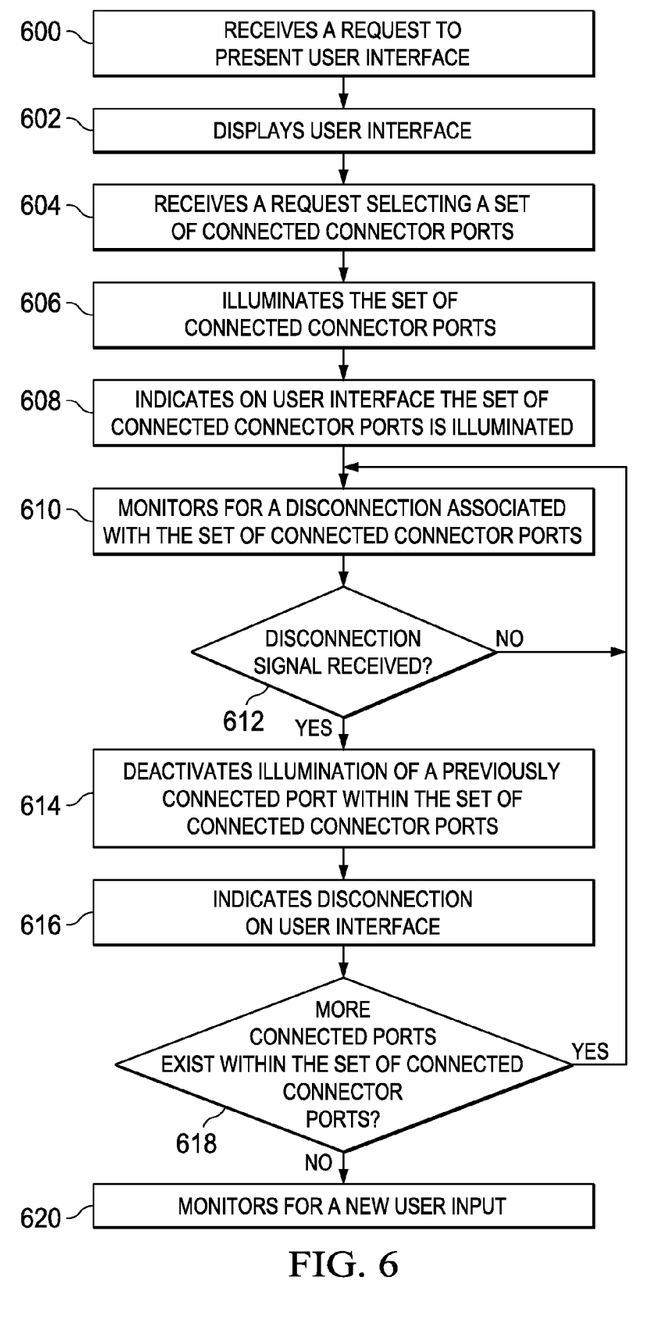
FIG. 6 is a flow diagram illustrating an embodiment of a method for disconnecting from a set of illuminable connector ports.

FIG. 6 is a flow diagram illustrating an embodiment of a method for disconnecting from a set of illuminable connector ports 108. The method of FIG. 6 may be implemented in a processor of electronic device 102, such as processors 204 shown in FIG. 2.

The method begins by receiving a request to present user interface 110 at block 600. The method displays user interface 110 at block 602. The method receives a request selecting a set of connected connector ports 116 among connector ports 108 at block 604 via user interface 110. At block 606, the method illuminates the set of connected connector ports 108 on electronic device 102. In addition, the method indicates the connected connector ports 108 as illuminated on user interface 110 at block 608. The method monitors for a disconnection associated with the set of connected connector ports 116 at block 610, In response to receiving a disconnection signal associated with the previously connected port 108 at block 612, the method deactivates illumination of a previously connected port 108 at block 614. The method indicates that the previously connected port 108 has been successfully disconnected on user interface 110 at block 616. At block 618, the method determines if more connected ports 108 exist within the set of connected connector ports 116. If more connected ports 108 exist, the method returns to block 610 and monitors for a disconnection associated with the set of connected connector ports 116. Once all the ports 108 within the set of connected connector ports 116 have been disconnected, the method monitors for a new user input at block 620. The user input may include, but is not limited to, the user selecting another set of connector ports 108 or exiting user interface 110.

Accordingly, the illustrative embodiments provide a port illumination system 100 for assisting a user in connecting and disconnecting external devices to connector ports 108 of electronic device 102. A user interface 110 is provided for visually and instructionally guiding the user in connecting and disconnecting to connector ports 108. Further, port illumination system 100 provides a mechanism for illuminating connector ports 108, thus, increasing the visibility of connector ports 108.

What is claimed is:

1. A method for illuminating a connector port of an electronic device, comprising:
presenting information associated with the connector port on a user interface;
responsive to a user selecting the connector port via the user interface, illuminating the connector port on the electronic device; and
responsive to determining that a connection is established between a connector and the illuminated connector port on the electronic device, deactivating illumination of the connector port on the electronic device.

2. The method of claim 1, further comprising depicting a graphical replica of the connector port on the electronic device.

3. The method of claim 1, further comprising indicating on the user interface that the connector port on the electronic device is illuminated.

4. The method of claim 1, further comprising, illuminating the connector port on the electronic device with a color corresponding to a compatible connector.

5. The method of claim 1, further comprising:
indicating on the user interface that the connector port on the electronic device is illuminated; and
responsive to determining that a connection is established between a connector and the illuminated connector port on the electronic device, indicating on the user interface deactivation of the illumination of the connector port on the electronic device.

6. The method of claim 1, further comprising indicating on the use interface an availability status associated with the connector port on the electronic device.

7. The method of claim 1, further comprising providing information on the user interface about compatible connector types for connection to the connector port on the electronic device.

8. The method of claim 1, wherein the electronic device comprises a plurality of connector ports, and wherein only one of the plurality of connector ports is illuminated in response to the user selecting the one of the plurality of connector ports via the user interface.

9. The method of claim 1, further comprising:
responsive to determining that the illuminated connector port on the electronic device is connected to a connector, indicating on the user interlace a connected status associated with the illuminated connector port; and
responsive to receiving a disconnect signal associated with the connector port on the electronic device, indicating on the user interface that the connector port has been disconnected.

10. An electronic device comprising of:
an illuminable connector port for connecting an external device to the electronic device; and
a user interface displayable by the electronic device for presenting information associated with the illuminable connector port, the user interface indicating an illumination status of the illuminable connector port, wherein, in response to receiving a user input that selects the connector port via the user interface, the connector port is illuminated and wherein the electronic device is configured to deactivate the illuminated connector port on the electronic device in response to determining that a connection is established between a connector and the illuminated connector port.

11. The electronic device of claim 10, wherein, in response to receiving a user input selecting the connector port via the user interface, the user interface indicates that the selected connector port is illuminated.

12. The electronic device of claim 10, wherein the connector port is illuminable with a color corresponding to a compatible connector.

13. The electronic device of claim 10, wherein the electronic device comprises a plurality of illuminable connector ports.

14. A method for illuminating connector ports of an electronic device, comprising:
- presenting information associated with a set of connector ports of the electronic device on a user interface;
- responsive to a user selecting a subset of the set of connector ports via the user interface, sequentially illuminating each of the subset of connector ports.

15. The method of claim 14, further comprising, responsive to determining that a connection is established between a connector and an illuminated connector port on the electronic device, deactivating illumination of the illuminated connector port on the electronic device.

16. The method of claim 14, wherein sequentially illuminating each of the subset of connector ports comprises:
- illuminating a first connector port of the subset of connector ports;
- deactivating illumination of the first connector port in response to determining that the first connector port on the electronic device is connected to a connector; and
- responsive to deactivating illumination of the first connector port, illuminating a second connector port of the subset of connector ports.

17. The method of claim 14, further comprising indicating on the user interface an illuminated connector port of the subset of connector ports.

* * * * *

UNITED STATES PATENT AND TRADEMARK OFFICE
CERTIFICATE OF CORRECTION

PATENT NO. : 9,460,684 B2  Page 1 of 1
APPLICATION NO. : 13/377535
DATED : October 4, 2016
INVENTOR(S) : Leonard Tsai It is certified that error appears in the above-identified patent and that said Letters Patent is hereby corrected as shown below:

In the Claims

In Column 6, Line 24 approx., in Claim 6, delete "use" and insert -- user --, therefor.

In Column 6, Line 37 approx., in Claim 9, delete "interlace" and insert -- interface --, therefor.

In Column 6, Line 53 approx., in Claim 10, delete "illuminated and" and insert -- illuminated, and --, therefor.

Signed and Sealed this
Twenty-seventh Day of March, 2018

Andrei Iancu
*Director of the United States Patent and Trademark Office*